(12) United States Patent
Kiribayashi

(10) Patent No.: US 7,804,414 B2
(45) Date of Patent: Sep. 28, 2010

(54) COLLISION-DETECTING DEVICE FOR AUTOMOTIVE VEHICLE

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 307 days.

(21) Appl. No.: 12/217,746

(22) Filed: Jul. 8, 2008

(65) Prior Publication Data

US 2009/0015390 A1 Jan. 15, 2009

(30) Foreign Application Priority Data

Jul. 13, 2007 (JP) .............................. 2007-183772

(51) Int. Cl.
  *G08B 21/00* (2006.01)
(52) U.S. Cl. ........................ 340/614; 340/612; 340/626; 340/605; 340/436; 180/274; 293/107; 293/110
(58) Field of Classification Search ................ 340/614, 340/612, 626, 605, 436; 701/45; 180/274; 280/735; 293/107, 110; 374/144, 142, 143
  See application file for complete search history.

(56) References Cited

U.S. PATENT DOCUMENTS

| 5,748,075 | A | 5/1998 | Dirmeyer et al. |
| 2005/0116817 | A1 | 6/2005 | Mattes et al. |

2006/0087417 A1 4/2006 Kiribayashi

FOREIGN PATENT DOCUMENTS

| JP | 11-014493 | 1/1999 |
| JP | 2005-53881 | 12/2005 |
| JP | 2006-117157 | 5/2006 |
| JP | 2006-216459 | 8/2006 |
| JP | 2006-292257 | 10/2006 |
| JP | 2007-263601 | 10/2007 |

*Primary Examiner*—George A Bugg
*Assistant Examiner*—Hongmin Fan
(74) *Attorney, Agent, or Firm*—Harness, Dickey & Pierce, PLC

(57) ABSTRACT

A device for detecting a collision of a vehicle with an obstacle includes an enclosed space positioned behind a front bumper cover. Deformation or displacement of the bumper cover due to a collision is transmitted to the enclosed space. Air pressure in the enclosed space and its temperature are measured by sensors and electrical signals representing the pressure and the temperature are fed to an electronic control unit that determines whether the enclosed space is hermetically closed or not based on the pressure and the temperature of the air in the enclosed space. If the enclosed space becomes non-hermetical due to a collision impact, the air therein leaks and the pressure therein becomes atmospheric pressure irrespective of the temperature of the air in the enclosed space. Therefore, the hermetical condition of the enclosed space is surely detected.

5 Claims, 2 Drawing Sheets

COLLISION-DETECTING DEVICE FOR AUTOMOTIVE VEHICLE

CROSS-REFERENCE TO RELATED APPLICATION

This application is based upon and claims benefit of priority of Japanese Patent Application No. 2007-183772 filed on Jul. 13, 2007, the content of which is incorporated herein by reference.

BACKGROUND OF THE INVENTION

1. Field of the Invention

The present invention relates to a device for detecting a collision of an obstacle with an automotive vehicle.

2. Description of Related Art

Some examples of the collision-detecting device for an automotive vehicle are disclosed in JP-A-2005-538881 and JP-A-2006-117157. The device shown in JP-A-2005-538881 includes a front sensor disposed in a cavity of an automotive vehicle. The front sensor detects a collision of the vehicle with an obstacle based on deformation of the cavity. The device shown in JP-A-2006-117157 determines whether a collided obstacle is a pedestrian or not, based on a pressure change in an enclosed chamber in a bumper cover. In these devices, however, a collision cannot be detected based on a pressure change if the enclosed chamber is not hermetically closed.

SUMMARY OF THE INVENTION

The present invention has been made in view of the above-mentioned problem, and an object of the present invention is to provide an improved collision-detecting device for an automotive vehicle, in which whether an enclosed space provided for detecting a collision is hermitically closed or not is surely detected.

The collision-detecting device according to the present invention includes a front bumper cover, a member for forming an enclosed space, a pressure sensor for detecting pressure in the enclosed space and a temperature sensor for directly or indirectly detecting temperature of air in the enclosed space. The enclosed-space-forming member is positioned behind the bumper cover so that deformation of the bumper cover due to a collision is transmitted to the enclosed-space-forming member. Electrical signals from the pressure sensor and the temperature sensor are fed to an electronic control unit that determines whether the enclosed space is hermetically enclosed or not based on the electrical signals.

Air is hermetically contained in the enclosed space when the enclosed space is formed. The air is contained at a room temperature Tm at a time when the enclosed space is formed. The pressure in the enclosed space linearly increases according to a temperature rise in the enclosed space, while the pressure linearly decreases as the temperature drops. A upper threshold pressure which is a little higher than an ideal temperature-pressure line is predetermined, and a lower threshold pressure which is a little lower than the ideal temperature-pressure line is also predetermined.

When a collision occurs, the bumper cover deforms and hits the enclosed space. The enclosed space is deformed or crushed by the collision impact transmitted from the bumper cover. When the temperature of the enclosed space is higher than the room temperature Tm at which the air was initially contained in the enclosed space, it is determined that the enclosed space is not hermetically closed if the pressure in the enclosed space is lower than the lower threshold pressure. When the temperature is lower than Tm, it is determined that the enclosed space is not hermetically closed if the pressure is higher than the higher threshold pressure. In this manner, whether the enclosed space is hermetical or not is surely detected. When it is determined that the enclosed space became non-hermetical, a warning is given to a driver.

When the temperature in the enclosed space is in a vicinity of the temperature Tm, it is difficult to detect that the enclosed space becomes non-hermetical because a pressure change in the enclosed space is not sufficiently large. In this case, the determination as to the hermetical condition of the enclosed space is made when the enclosed space is warmed up by operation of an engine. That is, the determination is made during a period in which the engine is idling or during a predetermined period after driving of the vehicle is initiated.

According to the present invention, whether the enclosed space in the collision-detecting device is hermetical or not is surely determined. Accordingly, a collision of the vehicle is detected without fail. Other objects and features of the present invention will become more readily apparent from a better understanding of the preferred embodiment described below with reference to the following drawings.

BRIEF DESCRIPTION OF THE DRAWINGS

FIG. 4 is a graph showing a temperature change in an enclosed space after an ignition switch is turned on.

DETAILED DESCRIPTION OF THE PREFERRED EMBODIMENT

Figure 1:
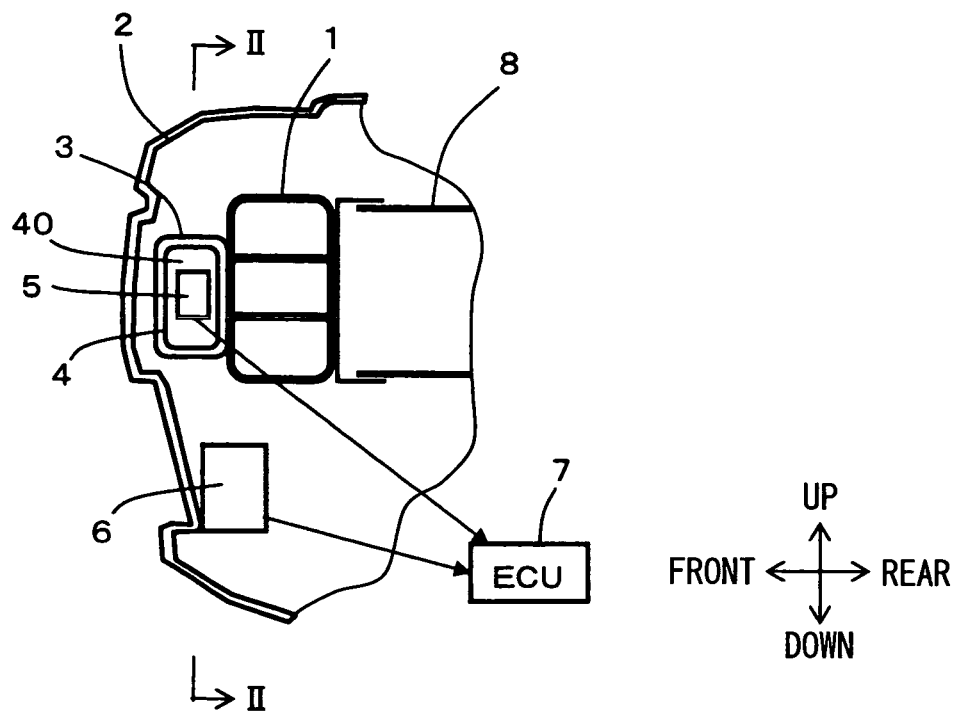
FIG. 1 is a schematic cross-sectional view showing a front portion of an automotive vehicle, taken along a vertical plane parallel to a front-to-rear direction.
Figure 2:
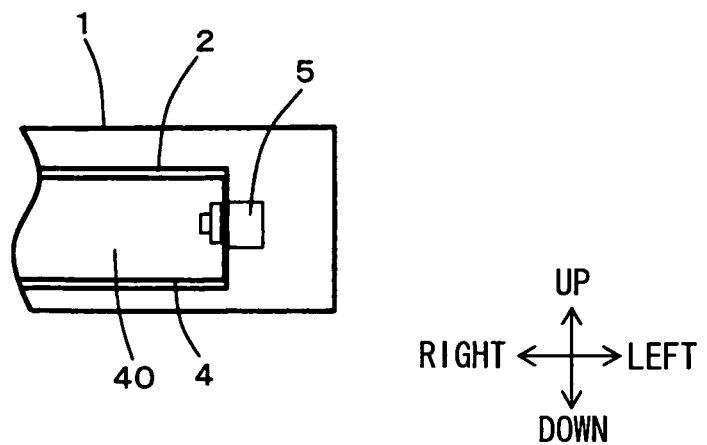
FIG. 2 is a schematic cross-sectional view showing components forming a collision-detecting device, taken along a line II-II shown in FIG. 1.

A preferred embodiment of the present invention will be described with reference to accompanying drawings. With reference to FIGS. 1 and 2, a structure of a collision-detecting device for an automotive vehicle according to the present invention will be described. The collision-detecting device of the present invention detects whether the vehicle collides with an obstacle, especially such as a pedestrian. The collision-detecting device includes a bumper-reinforcing member 1, a bumper cover 2, an impact absorber 3, an enclosed-space-forming member 4, a pressure sensor 5, a temperature sensor 6, and an electronic control unit (ECU) 7.

The bumper-reinforcing member 1 is a structural member forming a vehicle body. It extends in a width direction of the vehicle and is disposed in a front portion of the vehicle. The bumper-reinforcing member 1 is made of a metallic material and has a cross-section having hollow spaces and beams as shown in FIG. 1. A pair of side members 8 is firmly connected to both ends of the bumper-reinforcing member 1. A bumper cover 2 elongated in the width direction of the vehicle is disposed at the front-most position of the vehicle to cover the components of the collision-detecting device. When an obstacle hits the vehicle, it first hits the bumper cover 2. The bumper cover 2 moves toward the rear side of the vehicle when it collides with an obstacle.

The enclosed-space-forming member 4 elongated in the width direction of the vehicle and covered with the impact absorber 3 is positioned between the bumper-reinforcing member 1 and the bumper cover 2 and connected to the bumper-reinforcing member 1. The impact absorber 3 supports the bumper cover 2. The impact absorber 3 is made of a material such as a metallic material or a resin material. The width of the impact absorber 3 in the vehicle width direction is made a little smaller than the width of the bumper-reinforcing member 1. A thickness of the impact absorber 3 in the front-to-rear direction is formed to closely contact the bumper cover 2. Its thickness at a center portion is the thickest and becomes thinner as it goes to both sides. The impact absorber 3 deforms when a collision occurs and thereby absorbs a collision impact. When the vehicle hits a pedestrian, a collision impact is alleviated by the impact absorber 3.

The enclosed-space-forming member 4 is made of an easily deformable resin material in an elongated form in the width direction of the vehicle. It has a rectangular cross-section forming a hermetically enclosed space 40 in which air is contained. When a collision occurs, the enclosed space 40 is deformed or crushed because the bumper cover 2 moves toward the enclosed-space-forming member 4.

The pressure sensor 5 is connected to a side of the enclosed-space-forming member 4, as shown in FIG. 2. It detects air pressure in the enclosed chamber 40. Changes in the air pressure caused by deformation or crush of the enclosed space 40 due to a collision are detected by the pressure sensor 5. Electrical signals representing the air pressure in the enclosed space 40 are sent to the electronic control unit (ECU) 7. The temperature sensor 6 is positioned below the impact absorber 3 to detect ambient temperature, as shown in FIG. 1. The ambient temperature detected by the temperature sensor 6 is substantially equal to the air temperature in the enclosed chamber 40. In other words, the temperature sensor 6 indirectly detects the air temperature in the enclosed space 40. A temperature sensor provided for other devices such as an air-conditioner may be utilized as the temperature sensor 6. Electrical signals representing the detected temperature are fed to the ECU 7.

The ECU 7 detects a vehicle collision with an obstacle based on the air temperature in the enclosed space 40 detected by the temperature sensor 6 and the air pressure in the enclosed space 40 detected by the pressure sensor 5. The ECU 7 is able to detects types of the obstacles collided with the vehicle. If a pedestrian is hit by the vehicle, pedestrian-protecting devices such as an airbag for a pedestrian is operated. A device for popping up a hood may be operated to protect a colliding pedestrian.

The ECU 7 determines whether the enclosed space 40 is hermetically kept or not. Air is hermetically enclosed in the enclosed space 40 when it is manufactured. The enclosed space 40 may become non-hermetical by crush or deformation of the enclosed-space-forming member 4 due to a collision. If it is determined by the ECU 7 that the enclosed space 40 becomes non-hermetical, an abnormality warning may be given to a driver. Such abnormality is caused by air leakage from the enclosed space 40.

Figure 3:
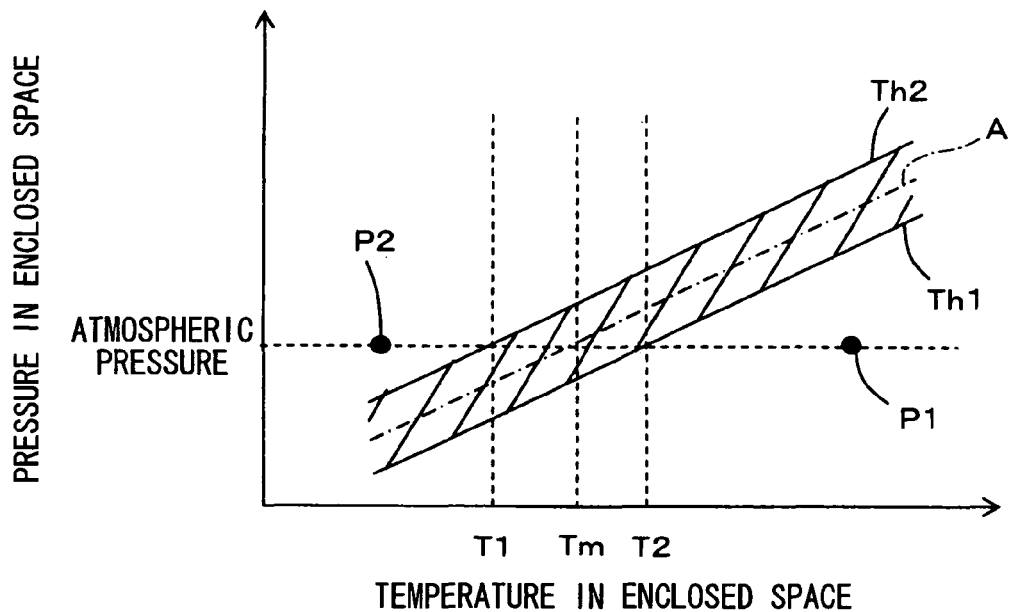
FIG. 3 is a graph showing a relation between temperature in an enclosed space and air pressure therein.
Figure 4:
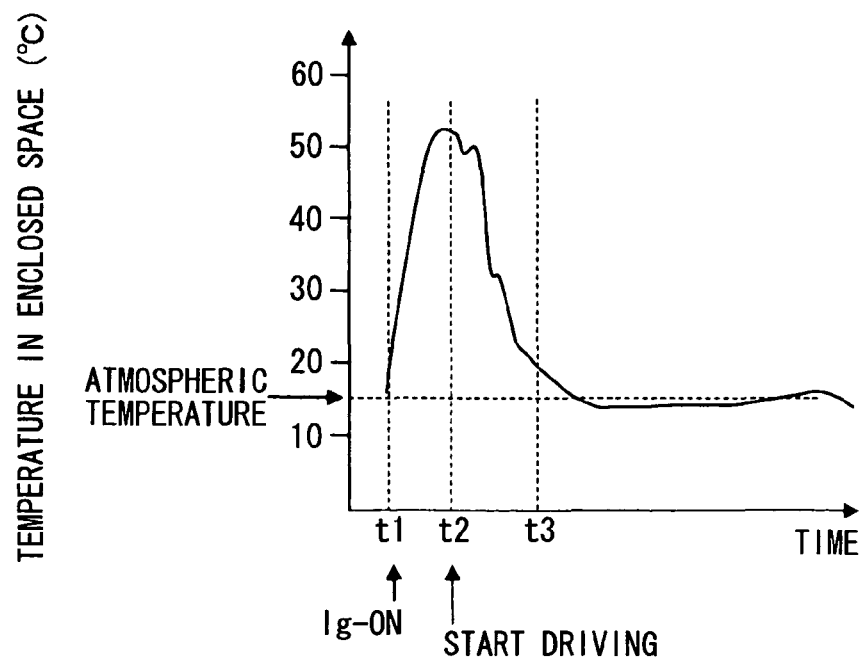

Detection of the abnormality will be explained with reference to FIG. 3 showing air pressure in the enclosed space 40 relative to the air pressure therein and FIG. 4 showing temperature in the enclosed space 40 in a certain period after the engine is started.

An amount of air enclosed in the space 40 is constant if the enclosed space 40 is kept hermetical. The air pressure in the enclosed space 40 linearly changes according to the air temperature in the enclosed space 40 as shown with a chained line "A" in FIG. 3. If the enclosed space 40 becomes non-hermetical and air leaks from the space 40, the air pressure in the space 40 becomes substantially equal to an atmospheric pressure, irrespective of the air temperature in the space 40. As shown in FIG. 3, a lower threshold Th1 (which is a little lower than "A") and an upper threshold Th2 (which is a little higher than "A") of the air pressure in the enclosed space 40 corresponding to various temperatures in the enclosed space 40 are pre-set.

In the normal state where the enclosed space is kept hermetical, the air pressure in the enclosed space 40 changes as shown by the chained line "A" according to the air temperature changes in the enclosed space 40. Considering a certain deviations or detection errors, the air pressure is in a region between the lower threshold Th1 and the upper threshold Th2. Assuming that the air temperature was Tm when the air is hermetically enclosed in the enclosed space 40, the air pressure will become the atmospheric pressure P1 which is apparently lower than Th1 if air leakage occurred in the enclosed space 40 when the air temperature is higher than Tm. Therefore, it is determined that the enclosed space 40 is not hermetically enclosed if the air pressure is lower than the lower threshold Th1 when the temperature is higher than Tm.

On the other hand, the air pressure in the enclosed space 40 will become the atmospheric pressure P2 which is apparently higher than Th2 if air leakage occurred in the enclosed space 40 when the air temperature is lower than Tm. Therefore, it is determined that the enclosed space 40 is not hermetically enclosed if the air pressure is higher than the upper threshold Th2 when the temperature is lower than Tm.

When the air temperature in the enclosed space 40 is in a vicinity of the temperature Tm (i.e., in a region from T1 to T2 shown in FIG. 3), an amount of the air pressure change in the enclosed space 40 is not sufficiently large to determine the leakage in the enclosed space 40 based on the pressure change. In other words, the lower threshold Th1 at temperature T2 is equal to the atmospheric pressure, and the upper threshold Th2 at temperature T1 is equal to the atmospheric pressure. In order to surely determine whether the enclosed space 40 is kept hermetical or not when the air temperature in the enclosed space 40 is in a vicinity of Tm (within the range from T1 to T2), the determination is made when the air temperature in the enclosed space 40 is increased in the following manner.

As shown in FIG. 4, the air temperature in the enclosed space 40 rises during idling operation of the engine after an ignition switch is turned on at time t1, because the air in the enclosed space 40 is heated by the engine. The air temperature in the enclosed space 40 decreases after the vehicle is started to be driven at time t2 because the air in the enclosed space 40 is gradually cooled down by outside air. The air temperature in the enclosed space 40 becomes a level that is a little higher than the atmospheric temperature at time t3, and thereafter it becomes substantially equal to the atmospheric temperature. This means that the air temperature in the enclosed space 40 becomes substantially higher than the temperature Tm without fail during the idling period (t1-t2) or a certain period (t2-t3) after the vehicle is started to be driven.

When the air temperature in the enclosed space 40 is initially in the vicinity of Tm, the determination whether the enclosed space 40 is hermetically enclosed or not is made when the air temperature is sufficiently high, i.e., during the idling period (t1-t2) or the certain period after initiation of driving (t2-t3). Thus, the determination as to the abnormality in the enclosed space 40 is surely detected.

The temperature sensor 6 is positioned close to the enclosed space 40 in the foregoing embodiment. Therefore, the temperature detected by the temperature sensor 6 is substantially equal to the air temperature in the enclosed space 40. Accordingly, as long as the air temperature detected by the temperature sensor 6 is not in the vicinity of Tm (i.e., outside the region of T1-T2 shown in FIG. 3), the determination of the abnormality in the enclosed space 40 can be performed anytime during the idling period or the period in which the vehicle is being driven.

The temperature sensor 6 is positioned close to the enclosed space 40 in the foregoing embodiment to indirectly detect the air temperature in the enclosed space 40. However, a temperature sensor may be positioned in the enclosed space 40 to directly detect the air temperature in the enclosed space 40. It is also possible to position a temperature sensor apart from the enclosed space 40. In this case, the temperature detected by the temperature sensor does not always represent the air temperature in the enclosed space 40. However, the temperature detected a certain period after vehicle-driving is initiated (i.e., after t3 shown in FIG. 4) becomes substantially equal to the atmospheric temperature. Therefore, the temperature detected by the temperature sensor represents the air temperature in the enclosed space 40. Accordingly, the determination of the abnormality in the enclosed space 40 can be carried out after time t3. In this case (where the temperature sensor is positioned apart form the enclosed space 40), there is a possibility that the determination cannot be made when the air temperature is in the vicinity of Tm (i.e., in a range of T1-T2 shown in FIG. 3).

While the present invention has been shown and described with reference to the foregoing preferred embodiment, it will be apparent to those skilled in the art that changes in form and detail may be made therein without departing from the scope of the invention as defined in the appended claims.

What is claimed is:

1. A device for detecting a collision of an obstacle with an automotive vehicle driven by an internal combustion engine, comprising:
    a bumper-reinforcing member elongated in a width direction of the vehicle;
    a bumper cover covering a front side of the bumper-reinforcing member, the bumper cover being adapted to be movable toward bumper-reinforcing member when an obstacle collides with the bumper cover;
    a member forming an enclosed space therein, the member being positioned between the bumper cover and the bumper-reinforcing member, the enclosed space being deformed by movement of the bumper cover toward the bumper-reinforcing member due to the collision;
    a pressure sensor for detecting air pressure in the enclosed space;
    a temperature sensor for directly or indirectly detecting air temperature in the enclosed space; and
    means for determining whether the enclosed space is hermetically enclosed or not based on the air pressure and the air temperature in the enclosed space.

2. The device for detecting a collision as in claim 1, wherein:
    the determining means determines that the enclosed space is not hermetically enclosed, when the detected air temperature in the enclosed space is higher than air temperature measured when the air was contained in the enclosed space, if the air pressure in the enclosed space is lower than a lower threshold pressure corresponding to the air temperature in the enclosed space, the lower threshold pressure being predetermined under a condition that the enclosed space is hermetically enclosed.

3. The device for detecting a collision as in claim 1, wherein:
    the determining means determines that the enclosed space is not hermetically enclosed, when the detected air temperature in the enclosed space is lower than air temperature measured when the air was contained in the enclosed space, if the air pressure in the enclosed space is higher than an upper threshold pressure corresponding to the air temperature in the enclosed space, the upper threshold pressure being predetermined under a condition that the enclosed space is hermetically enclosed.

4. The device for detecting a collision as in claim 1, wherein:
    the temperature sensor is a sensor for detecting ambient temperature, and the air pressure in the enclosed space is represented by the ambient temperature; and
    the determining means determines whether the enclosed space is hermetically enclosed or not when the automotive vehicle is being driven.

5. The device for detecting a collision as in claim 1, wherein:
    the determining means determines whether the enclosed space is hermetically enclosed or not, when the detected air temperature in the enclosed space is in a predetermined range in the vicinity of air temperature measured when the air was contained in the enclosed space, during a period in which the internal combustion engine is idling or during a predetermined period after driving of the vehicle is initiated.

* * * * *